Patented Jan. 1, 1952

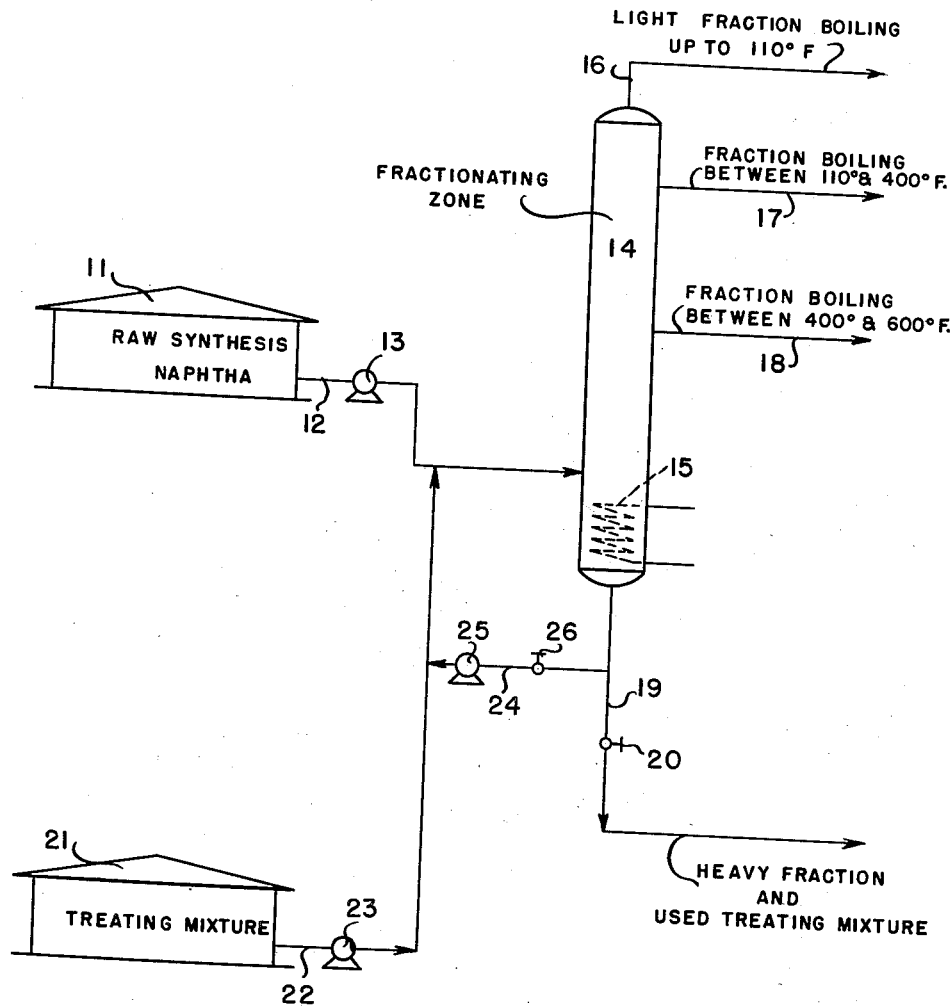

2,581,102

UNITED STATES PATENT OFFICE 2,581,102

REMOVAL OF OXYGENATED ORGANIC COMPOUNDS FROM HYDROCARBONS

Linnie P. Hodges, Baytown, Tex., assignor, by mesne assignments, to Standard Oil Development Company, Elizabeth, N. J., a corporation of Delaware Application October 25, 1948, Serial No. 56,447

3 Claims. (Cl. 260—450)

1

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work, commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contained with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of less attractive nature than the product resulting from the catalytic conversion of hydrocarbons themselves. For example, polymers having lubricating oil qualities may be produced by polymerizing alpha olefins in the presence of aluminum choloride, but, if these alpha olefins are contaminated with oxygenated organic compounds, as when produced from carbon monoxide and hydrogen, the product is not satisfactory in that the lubricating oil qualities are depreciated by the presence of oxygenated organic compounds. Furthermore, the oxygenated organic compounds react with the catalyst and destroy its activity requiring considerably larger quantities of catalysts to cause the

2 reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents, such as sulfur dioxide and the like and mixtures thereof. It has also been suggested to remove a portion of the oxygenated organic compounds by treatment of the naphtha with various chemical reagents. The prior art proposals have largely been unsatisfactory in that, while they are effective in removing a portion of the oxygenated organic contaminants in the naphtha, they are largely ineffective in substantially completely removing the oxygenated organic compounds.

It has now been discovered that the oxygenated organic compounds contained in hydrocarbons may be substantially reduced in quantity by distilling the contaminated hydrocarbon containing these materials over a treating reagent comprising a mixture of polyethylene glycol and alkali metal hydroxide. This treatment serves to remove substantially all of the oxygenated organic compounds from the hydrocarbons, and it is particularly effective in removing ketones which usually resist most treating procedures.

It is, therefore, the main object of the present invention to provide a process for removing oxygenated organic compounds from naphthas containing them by distilling the naphtha in contact with a treating reagent which will remove oxygenated organic compounds from hydrocarbons containing them.

Another object of the present invention is to provide a method for treating hydrocarbons containing oxygenated organic compounds as contaminants and olefins whereby the content of oxygenated organic compounds is substantially reduced and the hydrocarbons including the olefins are made suitable for employment in catalytic conversion operations.

A further object of the present invention is to disclose a process whereby a hydrocarbon mixture containing the various olefins and oxygenated organic compounds including ketones is treated such that the content of oxygenated organic compounds including ketones is substantially reduced and the olefins made suitable as a feed for producing synthetic lubricant polymers.

Still another object of the present invention is to provide a composition including polyethylene glycol and an alkali metal hydroxide, which is suitable for use at an elevated temperature in treating hydrocarbon fractions contaminated with oxygenated organic compounds to remove contaminating oxygenated organic compounds therefrom.

The objects of the present invention are attained by subjecting hydrocarbons, such as a synthetic crude petroleum obtained by the reaction of carbon monoxide and hydrogen, to a distillation operation in the presence of a treating mixture including polyethylene glycol and an alkali metal hydroxide under conditions to cause substantial removal of oxygenated organic compounds and to segregate fractions boiling in the gasoline and higher boiling ranges which are suitable for catalytic conversion operations.

The polyethylene glycols forming a component of the treating reagent in accordance with the present invention may have a molecular weight from about 400 to about 4000. The polyethylene glycols are characterized by having specific gravities ranging from about 1 to about 1.25 relative to water at normal room temperature, melting points in the range from 90° to 130° F., and Saybolt Universal viscosities in the range from 40 to 700 seconds at 210° F. These materials often have flash points ranging from about 400° F. up to about 550° F. The lower members of the series of the polyethylene glycols have molecular weights of about 380 to about 630 and are liquids or semi-solids while the higher members range in molecular weight from about 950 up to about 7500 and are solids. They are soft and odorless and are very easy to handle. More specific descriptions of the properties of polyethylene glycols may be found in "Synthetic Organic Chemicals," 12th edition, July 1, 1945, Carbides and Carbon Chemical Corp., New York.

The amount of polyethylene glycols employed in the treating reagent will vary from about 90 to 50% by weight of the treating agent while the remainder ranging from about 10 to 50% by weight will be alkali metal hydroxide.

The amount of treating agent employed in the practice of the present invention in contacting oxygenated organic compounds containing hydrocarbon will vary depending on the amount of oxygenated organic compounds in the hydrocarbon. Usually an amount of treating mixture in the range of about 5 to about 30 volume per cent of hydrocarbon being treated will give good results. Synthetic crude petroleum obtained from a synthesis operation in which carbon monoxide and hydrogen are contacted with an iron catalyst under synthesis conditions may be distilled in the presence of a mixture of 80% polyethylene glycol having a molecular weight of about 600 and about 20% by weight of sodium hydroxide, the treating mixture being used in an amount corresponding to 10 volume per cent of the hydrocarbon mixture.

The alkali metal hydroxide employed in the practice of the present invention is preferably sodium hydroxide, but potassium and lithium hydroxides may be substituted therefor. Sodium hydroxide is more available than the other alkali metal hydroxides and, consequently, will find wider usage. Under some conditions, ammonium hydroxide may be employed in lieu of the alkali metal hydroxides, but the latter will be preferred.

The invention will now be illustrated by reference to the drawing in which the sole figure presents a flow sheet of a preferred mode of practicing the invention.

Referring now to the drawing, numeral 11 designates a charge tank containing a hydrocarbon fraction such as a raw synthesis naphtha obtained as the hydrocarbon product from the synthesis of carbon monoxide and hydrogen over an iron catalyst. This fraction is pumped into the system from tank 11 by line 12 and pump 13 which discharges the hydrocarbon feed into a fractionation zone 14. Fractionation zone 14 is provided with a heating means 15 which is illustrated by a coil. This heating means is employed to adjust temperatures and pressures in zone 14. Fractionation zone 14 is shown as a single distillation tower, but it is understood that it may include a series of fractional distillation towers. It is also understood that distillation zone 14 will be provided with internal baffling equipment, such as bell cap trays or other internal equipment, to provide intimate contact between vapors and liquids.

Fractionation zone 14 is also provided with a line 16 to remove light fractions boiling up to about 110° F., line 17 by way of which a fraction boiling between 110° and 400° F. may be obtained, line 18 for removal of a fraction boiling between 400° and 600° F., and line 19 controlled by valve 20 by way of which the heavy fractions and the treating mixture, which will be described further, may be withdrawn from the system.

The raw feed naphtha introduced into fractionation zone 14 by line 12 and pump 13 has admixed with it an amount of the treating mixture sufficient to react with the oxygenated organic compounds contained in the raw synthesis naphtha and to cause removal thereof. Usually raw synthesis naphthas, produced by the reaction of carbon monoxide and hydrogen over an iron catalyst will contain in the neighborhood of 20 weight per cent of oxygenated organic compounds. To react with this content of oxygenated organic compounds, an amount of treating mixture in the range from about 5 to about 30 volume per cent may be employed. This will depend on the content of oxygenated organic compounds in the raw naphtha and this content will vary with the catalyst employed and the conversion conditions under which the naphtha is produced. The treating mixture is contained in tank 21 and is injected into the system by line 22 and pump 23 which allows the continuous injection of the treating mixture. The treating mixture in tank 21 will comprise a mixture of a polyethylene glycol and sodium hydroxide in the amounts given above.

The heavy fractions plus used treating mixture, withdrawn from fractionation zone 14 by line 19 may be recycled in part to line 22 by branch line 24 controlled by valve 26 and containing pump 25. Valve 26 may be adjusted to provide the proper ratio of the used treating mixture and the fresh treating mixture so that the oxygenated organic compounds may be removed from the raw naphtha with greatest efficiency.

The heavy fractions and used treating mixture not recycled in the process may be withdrawn from the system by manipulation of valve 20 in line 19. This fraction will contain useful hydrocarbons, oxygenated organic compounds dissolved in the treating reagent and the used treating reagent. To recover the valuable constituents contained therein, it may be desirable to dilute this fraction after cooling in suitable cooling means, not shown, with water or an aqueous solution to cause the formation of a hydrocarbon layer and an aqueous layer. The hydrocarbon layer and the aqueous layer are separable by gravity from each other. The hydrocarbon layer may be further used if desired while a substantial amount of the oxygenated organic compounds containing the aqueous layer may be recovered therefrom by acidification with a mineral acid.

Under some conditions, rather than dilute the fraction withdrawn from zone 14 by line 19 with water, it may be desirable to dilute this fraction with a heavy aromatic hydrocarbon such as a solvent extract of a lubricating oil fraction. It may also be desirable to recycle a portion of the heavy fraction diluted with water or with the heavy aromatic fraction to the treating zone. In fact, dilution either with water or with a heavy aromatic fraction may be beneficial in removing oxygenated compounds from the synthetic naphtha.

It will be seen from the foregoing description that a simple distillation process including a treating operation has been described wherein a contaminated hydrocarbon containing oxygenated organic compounds is subjected to distillation in the presence of a treating reagent comprising polyethylene glycol and alkali metal hydroxide to obtain an overhead fraction, substantially free of contaminants, which is useful in catalytic conversion operations.

The invention will now be further illustrated by specific runs in which a naphtha formed by the reaction of carbon monoxide and hydrogen over an iron-type catalyst was divided into four portions. One portion was subjected to distillation as is to recover fractions boiling between 110° and 400° F. and between 400° and 600° F. A second portion was treated with sodium hydroxide solution in an amount of 50 volume per cent. The sodium hydroxide solution had a strength of 5° Bé. The second portion, after separation from the caustic solution, was subjected to distillation conditions under comparable conditions to those used for the first portion to obtain fractions boiling between 110° and 400° F. and between 400° and 600° F.

The third portion was treated in accordance with the present invention in that a mixture containing polyethylene glycol having a molecular weight between 500 and 600 to which had been added 20 weight per cent sodium hydroxide was employed. Ten volume per cent of this mixture was added to the naphtha and the naphtha distilled under comparable conditions to those used in the other runs to obtain fractions having similar boiling ranges. In the next run the naphtha was distilled over 33 volume per cent of a solution to 50° Bé. sodium hydroxide to obtain a single fraction boiling between 110° and 400° F.

The fractions having the afore-mentioned boiling ranges were subjected to analysis for oxygenated organic compounds with the results reported in the following table:

Table

| Treatment | None | | Washed with NaOH and then distilled | | Distilled in presence of— | | |
|---|---|---|---|---|---|---|---|
| | | | | | Polyethylene Glycols and NaOH | | 50° Bé. NaOH |
| Boiling range, °F | 110-400 | 400-600 | 110-400 | 400-600 | 110-400 | 400-600 | 110-400 |
| Yield, Vol. Per Cent | 61.4 | 12.0 | -------- | -------- | 65.7 | 7.7 | -------- |
| Analysis: Oxygenated Organic Compounds weight per cent (expressed as functional group)— | | | | | | | |
| OH (alcohols) | 0.93 | 0.27 | 0.40 | 0.50 | 1.22 | 0.70 | 1.12 |
| CHO (aldehydes) | 0.62 | 0.15 | 0.82 | 0.33 | 0.10 | 0.00 | 0.00 |
| COOH (acids) | 0.92 | 0.47 | 0.00 | 0.00 | 0.00 | 0.20 | 0.00 |
| COO (esters) | 0.64 | 3.38 | 0.39 | 0.31 | 0.00 | 1.34 | 0.00 |
| CO (ketones) | 1.13 | 0.27 | 1.33 | 0.91 | 0.53 | 0.42 | 0.55 |

It will be seen from the foregoing data that distillation of the naphtha over the mixture of polyethylene glycol and sodium hydroxide resulted in substantially complete reduction in the content of aldehydes and organic acids, and practically complete removal of the esters in the lower boiling fraction. It will also be noted that the amount of ketones has been substantially reduced by treatment with the reagent employed in the present invention. The amount of alcohols remaining after the treatment with the reagent in accordance with the present invention is not disadvantageous since alcohols may be easily extracted with aqueous methanol.

The increase in alcohols contained in the low boiling fraction treated in accordance with the present invention may be due to a tendency of the lower molecular weight polyethylene glycols to undergo a cracking reaction at the temperatures necessary to obtain a fraction boiling up to 600° F. This tendency of the low molecular weight polyethylene glycols to crack may be eliminated by employing a higher molecular weight polyethylene glycol when high boiling fractions are distilled. The tendency may also be eliminated by conducting the distillation operation under subatmospheric pressures or conducting the distillation operation in the presence of steam and the like.

It is surprising that polyethylene glycols in admixture with alkali metal hydroxide should be effective as a treating reagent in removing oxygenated organic compounds by distilling hydrocarbons containing them over the treating reagent since it has been found that distillation of oxygenated organic compound-containing hydrocarbons in the presence of a great excess of polyethylene glycols alone resulted in substantially little or no removal of oxygenated organic compounds.

The nature and objects of the present invention having been completely described and illustrated, what I wish to claim as new and useful and to secure by Letters Patent is:

1. A method for removing oxygenated organic compounds from a raw feed naphtha obtained from the synthesis of carbon monoxide and hydrogen over an iron catalyst which comprises mixing said raw feed naphtha as a liquid with a liquid treating reagent consisting of 90% to 50% by weight of a polyethylene glycol having a molecular weight in the range between 400 and 4000 and 10% to 50% by weight of an alkali metal hydroxide to form a liquid mixture, charging said liquid mixture into a fractionation zone and there heating it to cause fractions boiling up to 600° F. to vaporize in the fractionating zone, condensing the fractions boiling up to 600° F. out of contact with said treating reagent and unvaporized portions of the feed naphtha to secure condensate substantially free of oxygenated compounds, and removing said condensate from the fractionating zone.

2. A method in accordance with claim 1 in which the raw feed naphtha is admixed with an amount of the treating reagent in the range from about 5 to about 30 volume per cent.

3. A method in accordance with claim 2 in which the alkali metal hydroxide is sodium hydroxide.

LINNIE P. HODGES.

REFERENCES CITED

The following references are of record in the file of this patent:

UNITED STATES PATENTS

| Number | Name | Date |
| --- | --- | --- |
| 1,639,531 | Phillips et al. | Aug. 16, 1927 |
| 2,200,494 | Fife | May 14, 1940 |
| 2,266,359 | Edwards | Dec. 16, 1941 |
| 2,410,642 | Farkas et al. | Nov. 5, 1946 |
| 2,464,019 | Bond et al. | Mar. 8, 1949 |